(12) United States Patent
Komori et al.

(10) Patent No.: US 10,298,004 B2
(45) Date of Patent: May 21, 2019

(54) SEAL STRUCTURE FOR MULTICORE CABLE, AND RUBBER PLUG

(71) Applicants: AUTONETWORKS TECHNOLOGIES, LTD., Yokkaichi-shi, Mie (JP); SUMITOMO WIRING SYSTEMS, LTD., Yokkaichi-shi, Mie (JP); SUMITOMO ELECTRIC INDUSTRIES, LTD., Osaka-shi, Osaka (JP)

(72) Inventors: Hirokazu Komori, Yokkaichi (JP); Makoto Higashikozono, Yokkaichi (JP); Hisashi Sawada, Yokkaichi (JP)

(73) Assignees: AUTONETWORKS TECHNOLOGIES, LTD., Yokkaichi-shi, Mie (JP); SUMITOMO WIRING SYSTEMS, LTD., Yokkaichi-shi, Mie (JP); SUMITOMO ELECTRIC INDUSTRIES, LTD., Osaka-shi, Osaka (JP)

( * ) Notice: Subject to any disclaimer, the term of this patent is extended or adjusted under 35 U.S.C. 154(b) by 0 days.

(21) Appl. No.: 16/064,811

(22) PCT Filed: Nov. 29, 2016

(86) PCT No.: PCT/JP2016/085327
§ 371 (c)(1),
(2) Date: Jun. 21, 2018

(87) PCT Pub. No.: WO2017/110377
PCT Pub. Date: Jun. 29, 2017

(65) Prior Publication Data
US 2019/0006834 A1 Jan. 3, 2019

(30) Foreign Application Priority Data
Dec. 24, 2015 (JP) .................................. 2015-251372

(51) Int. Cl.
*H01B 7/02* (2006.01)
*H02G 15/04* (2006.01)
*H02G 15/013* (2006.01)

(52) U.S. Cl.
CPC ............... *H02G 15/04* (2013.01); *H01B 7/02* (2013.01); *H02G 15/013* (2013.01); *H02G 15/046* (2013.01)

(58) Field of Classification Search
CPC .... H02G 15/04; H02G 15/013; H02G 15/046; H01R 11/09; H01R 11/11; H01R 13/58; H01R 13/72; H01B 7/02; H01B 7/04
(Continued)

(56) References Cited

U.S. PATENT DOCUMENTS 5,720,487 A * 2/1998 Kato ................... H01R 13/5205
277/637
6,341,983 B1 * 1/2002 Crawford ............. H01R 13/521
439/275
(Continued)

OTHER PUBLICATIONS

International Search Report and Written Opinion for Application No. PCT/JP2016/085327 dated Jan. 31, 2017; 6 pages.

*Primary Examiner* — William H. Mayo, III
(74) *Attorney, Agent, or Firm* — Reising Ethington, P.C.

(57) ABSTRACT

A seal structure for a multicore cable includes a multicore cable in which a plurality of electrical wires are enveloped by a sheath, the plurality of electrical wires extending out from an end portion of the sheath, and a rubber plug having a sheath fitting portion that is fitted around the end portion of the sheath, in which the plurality of electrical wires in a power electrical wire pair, a first signal electrical wire pair, and a second signal electrical wire pair are arranged point-symmetrically in a region in which the sheath fitting portion is fitted around the end portion of the sheath, in a cross
(Continued)

section of the sheath that is orthogonal to a longitudinal direction of the multicore cable.

6 Claims, 21 Drawing Sheets

(58) Field of Classification Search
USPC ... 174/74 R, 75 R, 75 B, 76, 77 R, 82, 84 R, 174/88 R, 88 S, 92, 93, 94 R, 94 S; 439/587–589, 274, 345, 352, 275
See application file for complete search history.

(56) References Cited

U.S. PATENT DOCUMENTS

| | | | | |
|---|---|---|---|---|
| 6,602,090 B2* | 8/2003 | Kato | ............... | H01R 13/5205 |
| | | | | 439/455 |
| 6,609,932 B2* | 8/2003 | Fukatsu | ........... | H01R 13/4368 |
| | | | | 439/274 |
| 7,033,216 B2* | 4/2006 | Ito | ................. | H01R 13/5208 |
| | | | | 439/275 |
| 7,044,762 B1* | 5/2006 | Hong | ............. | H01R 13/5213 |
| | | | | 439/275 |
| 7,104,841 B2* | 9/2006 | Fukatsu | ........... | H01R 13/5208 |
| | | | | 439/275 |
| 8,109,789 B2* | 2/2012 | Tyler | ............... | H01R 13/5205 |
| | | | | 439/587 |
| 2013/0105219 A1* | 5/2013 | Osawa | .......... | H01R 13/5208 |
| | | | | 174/77 R |
| 2014/0238722 A1* | 8/2014 | Hayashishita | ...... | H01B 13/34 |
| | | | | 174/115 |
| 2014/0353029 A1* | 12/2014 | Tsubouchi | ....... | H01R 13/6463 |
| | | | | 174/72 A |

* cited by examiner

SEAL STRUCTURE FOR MULTICORE CABLE, AND RUBBER PLUG

CROSS REFERENCE TO RELATED APPLICATIONS

This application claims the priority of Japanese patent application JP2015-251372 filed on Dec. 24, 2015, the entire contents of which are incorporated herein. This application also claims priority to Application Number PCT/JP2016/085327, filed Nov. 29, 2016, the content of which are disclosed herein.

TECHNICAL FIELD

The technology disclosed in the present specification relates to a seal structure for a multicore cable including a plurality of electrical wires, and a rubber plug.

BACKGROUND ART

Conventionally, the waterproof structure as disclosed in JP 2003-174716A (Patent Document 1) is known as a structure for waterproofing terminal portions of a multicore sheath cable. In this structure, a tubular member is fitted around a front end of a sheath of a multicore sheath cable from which a plurality of electrical wires are drawn out, and this tubular member is filled with a sealing material such as a silicone-based adhesive.

In the above-described multicore sheath cable, first, the front end of a nozzle is inserted into a gap between the sheath and the tubular member, and a sealing material is injected from the front end of the nozzle, the front end of the nozzle is then inserted between a plurality of electrical wires, and the sealing material is injected from the front end of this nozzle between the plurality of electrical wires. Accordingly, the electrical wires and the sheath are sealed, and the electrical wires are sealed.

SUMMARY

However, according to the above-described technology, if the plurality of electrical wires are non-uniformly arranged, there was a concern that the plurality of electrical wires will be sealed insufficiently.

The technology disclosed in the present specification was achieved in light of the above-described situation, and an object thereof is to provide technology by which the sealing property of a multicore cable is improved.

A seal structure for a multicore cable according to the technology disclosed in the present specification includes a multicore cable in which a plurality of electrical wires are enveloped by a sheath, the plurality of electrical wires extending out from an end portion of the sheath; and a rubber plug having a sheath fitting portion that is fitted around the end portion of the sheath, in which a plurality of electrical wire groups are arranged point-symmetrically in a region in which the sheath fitting portion is fitted around the end portion of the sheath, in a cross section of the sheath that is orthogonal to a longitudinal direction of the multicore cable, the plurality of electrical wire groups each being constituted by at least two of the plurality of electrical wires.

According to the above-described configuration, the plurality of electrical wires are arranged approximately point-symmetrically in the cross section of the sheath that is orthogonal to the longitudinal direction of the multicore cable. Accordingly, the sheath pressed by the rubber plug deforms inward in the radial direction of the sheath, and has a shape that substantially conforms to outer surfaces of the plurality of electrical wires. As a result, the inner pressure of the sheath is evenly applied to the plurality of electrical wires, and thus the seal between the sheath and the rubber plug can be improved.

The following aspects are preferable as embodiments of the present embodiment.

The electrical wire groups preferably include a twisted pair obtained by twisting the two electrical wires.

According to the above-described configuration, it is possible to reduce the influence of noise on the electrical wire group that includes the twisted pair.

The technology disclosed in this specification can be suitably applied to a configuration in which the plurality of electrical wires include six electrical wires, and the plurality of electrical wire groups are constituted by three electrical wire groups that each include two electrical wires.

According to the above-described configuration, it is possible to improve the seal between the sheath and the rubber plug with regard to the multicore cable in which the plurality of electrical wires include six electrical wires, the plurality of electrical wire groups are constituted by three electrical wire groups that each include two electrical wires.

The technology disclosed in this specification can be suitably applied to a configuration in which the plurality of electrical wire groups include narrow electrical wire groups including narrow electrical wires that each have a relatively small diameter and wide electrical wire groups including wide electrical wires that each have a larger diameter than the narrow electrical wires.

According to the above-described configuration, even though the electrical wires have different diameters, the plurality of electrical wire groups are arranged point-symmetrically in a cross section of the sheath that is orthogonal to the longitudinal direction of the multicore cable, and thereby, the internal pressure of the sheath can be evenly applied to the plurality of electrical wires. Accordingly, it is possible to improve the seal between the sheath and the rubber plug.

It is preferably that two of the narrow electrical wire groups are arranged point-symmetrically, with the wide electrical wire groups interposed therebetween, in the cross section of the sheath that is orthogonal to the longitudinal direction of the multicore cable.

According to the above-described configuration, two of the narrow electrical wire groups may be arranged point-symmetrically, with the wide electrical wire groups interposed therebetween, in a state in which the wide electrical wire groups are arranged at a central position. Accordingly, it is possible to make the sheath enveloping the wide electrical wire groups and the narrow electrical wire groups close to a circle, and thus to evenly apply a force to the plurality of electrical wires.

The rubber plug may have an electrical wire through-hole portion having a plurality of through-holes through which the plurality of electrical wires respectively pass, the plurality of electrical wires extending out from the end portion of the sheath, inner circumferential surfaces of the plurality of through-holes are each provided with electrical wire side-lips that are in intimate contact with outer circumferential surfaces of the plurality of electrical wires, the plurality of through-holes form a plurality of through-hole groups corresponding to the plurality of electrical wire groups, and the through-hole groups are point symmetrically formed in the cross section of the sheath that is orthogonal to the longitudinal direction of the multi core cable.

The rubber plug may be provided with, at a position located between the sheath fitting portion and the electrical wire through-hole portion, a holding portion configured to hold a guide member having a plurality of guide holes for passage of the plurality of respective electrical wires extending out from the end portion of the sheath, and the plurality of guide holes and the plurality of through-holes correspond to each other in a state in which the guide member is held by the holding portion.

According to the above-described configuration, the plurality of electrical wire groups can be guided to the plurality of guide holes in a state in which a point-symmetrical arrangement of the plurality of electrical wire groups is maintained.

According to the above-described configuration, the plurality of electrical wires respectively pass through the plurality of through-holes and are sealed by the electrical wire-side lips. Accordingly, it is possible to improve the seal between the electrical wires and the rubber plug. Furthermore, because the plurality of through-hole groups are point symmetrically formed in a cross section of the sheath that is orthogonal to the longitudinal direction of the multicore cable, a point-symmetrical arrangement of the plurality of electrical wire groups can be maintained.

Also, the technology disclosed in the present specification is a rubber plug for attachment to a multicore cable in which a plurality of electrical wire groups are enveloped by a sheath, the plurality of electrical wire groups each being constituted by at least two electrical wires, the plurality of electrical wires extending out from an end portion of the sheath, and the rubber plug includes a sheath fitting portion that is fitted around the end portion of the sheath, and an electrical wire through-hole portion having a plurality of through-holes through which the plurality of electrical wires respectively pass, the plurality of electrical wires extending out from the end portion of the sheath, in which an inner circumferential surface of the sheath fitting portion is provided with a sheath-side lip that is in intimate contact with an outer circumferential surface of the sheath, inner circumferential surfaces of the plurality of through-holes are each provided with electrical wire-side lips that are in intimate contact with outer circumferential surfaces of the plurality of electrical wires, the plurality of through-holes form a plurality of through-hole groups corresponding to the plurality of electrical wire groups, and the plurality of through-hole groups are point symmetrically formed in a cross section of the sheath that is orthogonal to a longitudinal direction of the multicore cable.

According to the above-described configuration, the plurality of electrical wires respectively pass through the plurality of through-holes and are sealed by the electrical wire-side lips. Accordingly, it is possible to improve the seal between the electrical wires and the rubber plug. Furthermore, because the plurality of through-hole groups are point symmetrically formed in a cross section of the sheath that is orthogonal to the longitudinal direction of the multicore cable, a point-symmetrical arrangement of the plurality of electrical wire groups can be maintained.

The rubber plug may be provided with, at a position located between the sheath fitting portion and the electrical wire through-hole portion, a holding portion configured to hold a guide member having a plurality of guide holes for passage of the plurality of respective electrical wires extending out from the end portion of the sheath, and the plurality of guide holes and the plurality of through-holes correspond to each other in a state in which the guide member is held by the holding portion.

According to the above-described configuration, the plurality of electrical wire groups can be guided to the plurality of guide holes in a state in which a point-symmetrical arrangement of the plurality of electrical wire groups is maintained.

According to the technology disclosed in the present specification, it is possible to improve the sealing property of a multicore cable.

DESCRIPTION OF EMBODIMENTS

Embodiment 1

Figure 1:
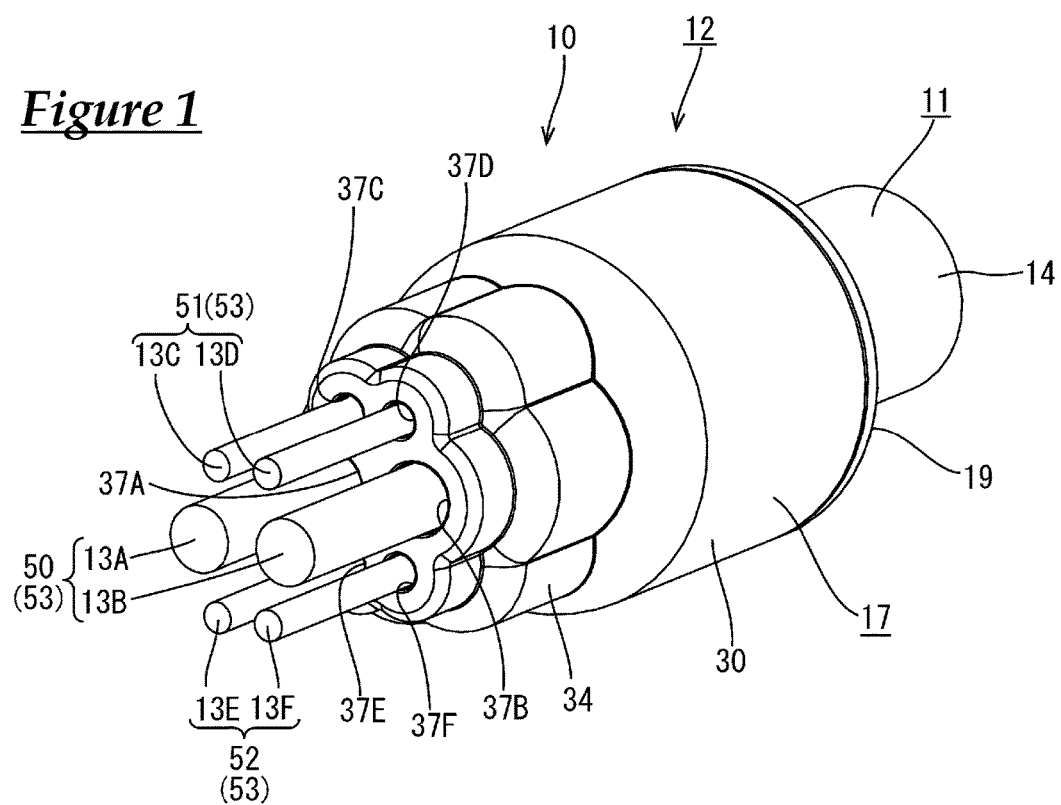
FIG. 1 is a perspective view showing a seal structure for a multicore cable according to Embodiment 1.
Figure 2:
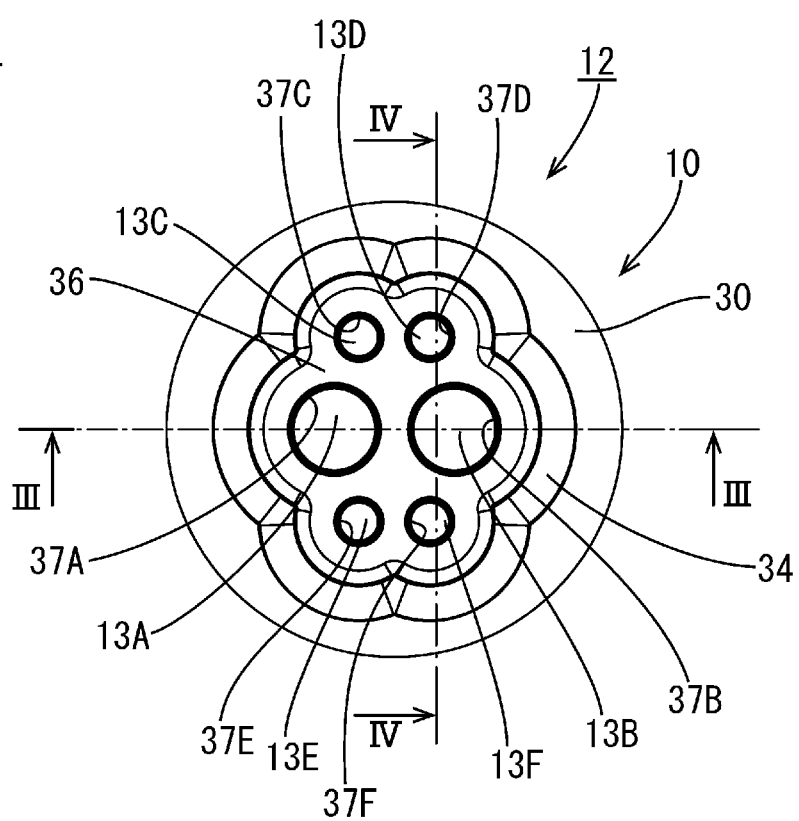
FIG. 2 is a front view showing the seal structure for a multicore cable.

Embodiment 1 is applied to a seal structure 12 for a multicore cable 11 will be described with reference to FIGS. 1 to 15. The present embodiment can be applied to a wire harness for an electrical parking brake that is installed in a vehicle (not shown), for example.

As shown in FIGS. 1 to 4, the cable 11 according to the present embodiment has a configuration in which a plurality (six in the present embodiment) of electrical wires 13A, 13B, 13C, 13D, 13E, and 13F are enveloped by a sheath 14 that is made of an insulating synthetic resin. The electrical wires 13A, 13B, 13C, 13D, 13E, and 13F have a configuration in which the outer circumferential surface of a metal core wire (not shown) is covered by a synthetic resin insulating covering (not shown). The multicore cable 11 has a circular cross-section. The multicore cable 11 extends along the axis of the sheath 14. The axis is a virtual line, and is defined as an imaginary line that extends along the longitudinal direction of the multicore cable 11 at a central position on the cross section of the sheath 14.

The six electrical wires 13A, 13B, 13C, 13D, 13E, and 13F include a first electrical wire 13A and a second electrical wire 13B for power, which are for connection to an electrical parking brake motor, and a third electrical wire 13C, a fourth electrical wire 13D, a fifth electrical wire 13E, and a sixth electrical wire 13F for signals, which are for connection to a sensor. The first electrical wire 13A, the second electrical wire 13B, the third electrical wire 13C, the fourth electrical wire 13D, the fifth electrical wire 13E, and the sixth electrical wire 13F have circular cross-sections.

The outer diameters of the first electrical wire 13A and the second electrical wire 13B are set to be larger than the outer diameters of the third electrical wire 13C, the fourth electrical wire 13D, the fifth electrical wire 13E, and the sixth electrical wire 13F. The outer diameter of the first electrical wire 13A is set to be the same as the outer diameter of the second electrical wire 13B. Also, the outer diameter of the third electrical wire 13C is set to be the same as the outer diameter of the fourth electrical wire 13D. Also, the outer diameter of the fifth electrical wire 13E is set to be the same as the outer diameter of the sixth electrical wire 13F. Note that the outer diameters of the third electrical wire 13C and the fourth electrical wire 13D are set to be substantially the same as the outer diameters of the fifth electrical wire 13E and the sixth electrical wire 13F. "Substantially the same" encompasses cases where their outer diameters are the same and cases where these electrical wires have different outer diameters to such an extent that their outer diameters can be recognized as substantially the same.

The first electrical wire 13A and the second electrical wire 13B form a power electrical wire pair 50 (one example of electrical wire groups). Also, the third electrical wire 13C and the fourth electrical wire 13D form a first signal electrical wire pair 51 (one example of electrical wire groups), and the fifth electrical wire 13E and the sixth electrical wire 13F form a second signal electrical wire pair 52 (one example of electrical wire groups).

The third electrical wire 13C and the fourth electrical wire 13D are twisted together, forming a so-called twisted pair. Also, the fifth electrical wire 13E and the sixth electrical wire 13F are twisted together, also forming a so-called twisted pair 53.

The first electrical wire 13A, the second electrical wire 13B, the third electrical wire 13C, the fourth electrical wire 13D, the fifth electrical wire 13E, and the sixth electrical wire 13F extend and branch out from an end portion 14A of the sheath 14 of the multicore cable 11.

Figure 3:
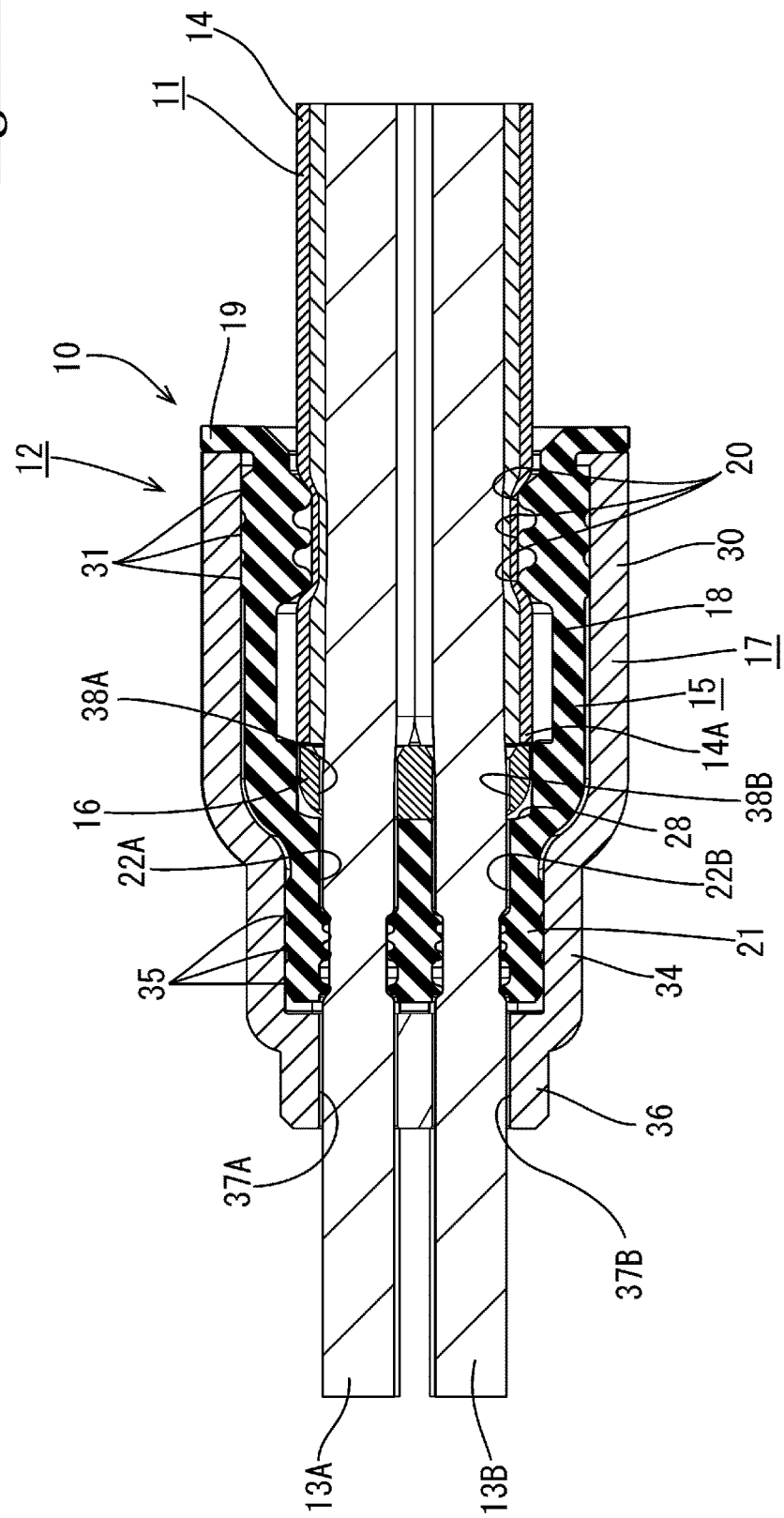
FIG. 3 is a cross-sectional view taken along line in FIG. 2.
Figure 4:
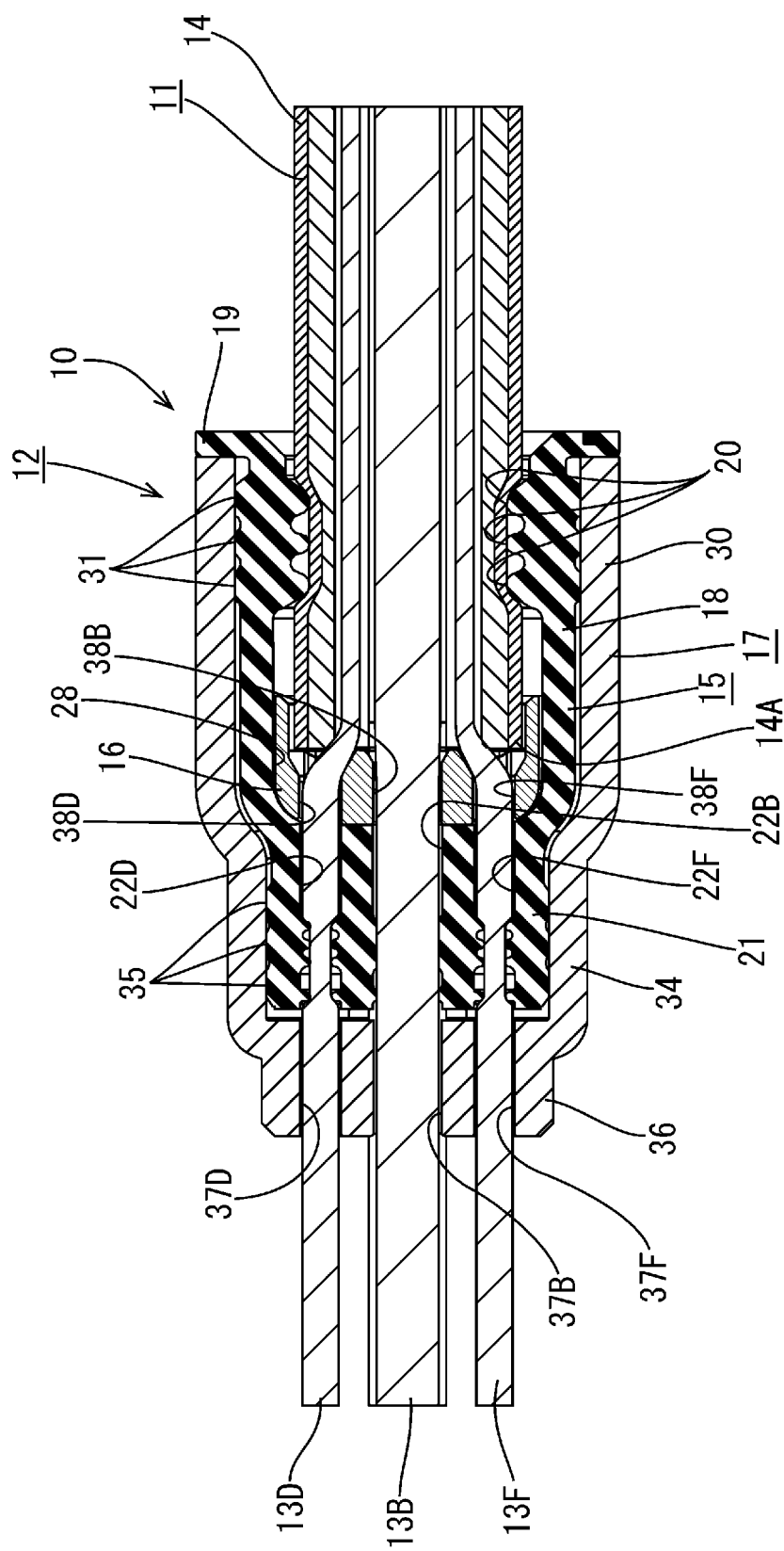
FIG. 4 is a cross-sectional view taken along line IV-IV in FIG. 2.

As shown in FIGS. 3 and 4, the seal member 10 is attached to the end portion 14A of the sheath 14 of the cable 11, specifically to the region in which the first electrical wire 13A, the second electrical wire 13B, the third electrical wire 13C, the fourth electrical wire 13D, the fifth electrical wire 13E, and 13F are branched. The intrusion of a liquid such as water or oil through the end portion 14A of the sheath 14 into the sheath 14 is suppressed by the seal member 10. The seal member 10 includes a rubber plug 15 that is fitted around the end portion 14A of the sheath 14, and a cap 17 that is fitted around the rubber plug 15.

As shown in FIGS. 3 and 4, the rubber plug 15 is fitted around the end portion 14A of the sheath 14. The rubber plug 15 has a sheath fitting portion 18 that is fitted around the end portion 14A of the sheath 14. The sheath fitting portion 18 extends to the side opposite to the end portion 14A of the sheath 14 and is shaped as a hood that is open in a direction that is opposite to the end portion 14A of the sheath 14. A flange portion 19 that protrudes outward in the radial direction of the sheath fitting portion 18 is formed at an end edge portion of the sheath fitting portion 18. The sheath fitting portion 18 is shaped as a substantially circular tube in its natural state.

As shown in FIGS. 3 and 4, a plurality of sheath-side lips 20 that protrude inward are formed as rings that extend along the circumferential direction of the sheath fitting portion 18 on the inner circumferential surface of the sheath fitting portion 18. In the state where the sheath fitting portion 18 is fitted around the end portion 14A of the sheath 14, the sheath-side lips 20 are in intimate contact with the outer circumferential surface of the sheath 14. This seals the rubber plug 15 and the sheath.

Figure 6:
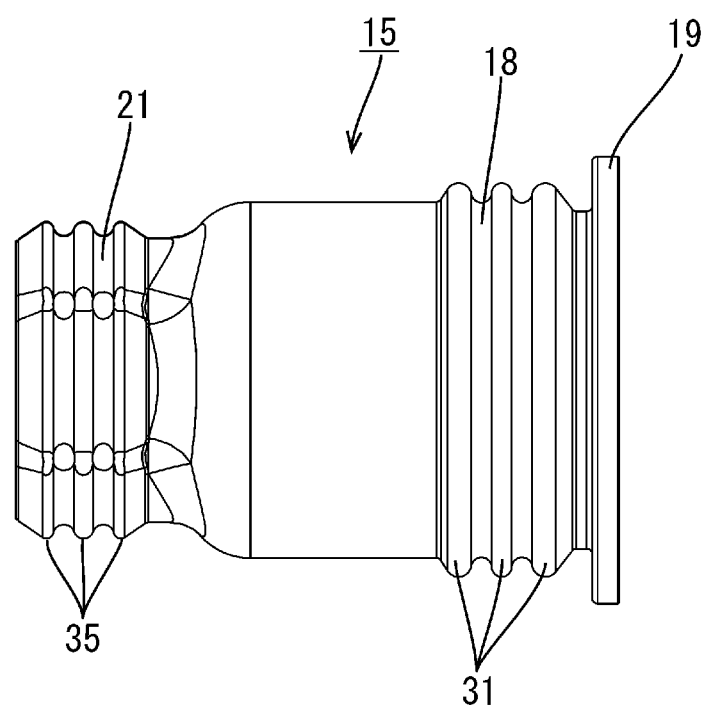
FIG. 6 is a side view showing the rubber plug.
Figure 7:
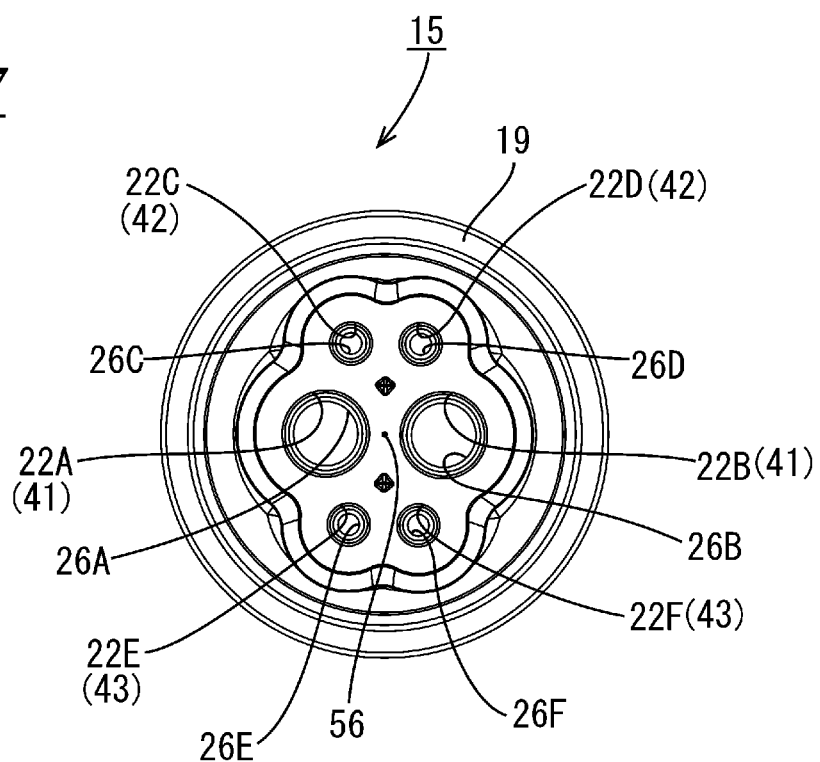
FIG. 7 is a front view showing the rubber plug.

As shown in FIGS. 6 and 7, an electrical wire through-hole portion 21 is provided at an end portion that is opposite to the sheath fitting portion 18 of the rubber plug 15, and the electrical wire through-hole portion 21 has a plurality (six in the present embodiment) of through-holes 22A, 22B, 22C, 22D, 22E, and 22F for passage of the first electrical wire 13A, the second electrical wire 13B, the third electrical wire 13C, the fourth electrical wire 13D, the fifth electrical wire 13E, and the sixth electrical wire 13F respectively. The through-holes 22A, 22B, 22C, 22D, 22E, and 22F include a first through-hole 22A for passage of the first electrical wire 13A, a second through-hole 22B for passage of the second electrical wire 13B, a third through-hole 22C for passage of the third electrical wire 13C, a fourth through-hole 22D for passage for the fourth electrical wire 13D, a fifth through-hole 22E for passage for the fifth electrical wire 13E, and a sixth through-hole 22F for passage for the sixth electrical wire 13F.

As shown in FIG. 7, the electrical wire through-hole portion 21 is provided with the third through-hole 22C and the fourth through-hole 22D that are formed side-by-side in the horizontal direction in FIG. 7 on the upper side in FIG. 7.

In FIG. 7, the first through-hole 22A and the second through-hole 22B are formed side-by-side in the horizontal direction in FIG. 7, below the third through-hole 22C and the fourth through-hole 22D.

In FIG. 7, the fifth through-hole 22E and the sixth through-hole 22F are formed side-by-side in the horizontal direction in FIG. 8 below the first through-hole 22A and the second through-hole 22B.

The inner diameter of the first through-hole 22A is somewhat larger than the outer diameter of the first electrical wire 13A. First electrical wire-side lips 26A that come into intimate contact with the outer circumferential surface of the first electrical wire 13A are formed as rings that extend along the circumferential direction of the first through-hole 22A on the inner circumferential surface of the first through-hole 22A. In the state where the first electrical wire 13A passes through the interior of the first through-hole 22A, the first electrical wire-side lips 26A are in intimate contact with the outer circumferential surface of the first electrical wire 13A. This seals the first electrical wire 13A and the rubber plug 15.

The inner diameter of the second through-hole 22B is somewhat larger than the outer diameter of the second electrical wire 13B. Second electrical wire-side lips 26B that come into intimate contact with the outer circumferential surface of the second electrical wire 13B are formed as rings that extend along the circumferential direction of the second through-hole 22B on the inner circumferential surface of the second through-hole 22B. In the state where the second electrical wire 13B passes through the interior of the second through-hole 22B, the second electrical wire-side lips 26B are in intimate contact with the outer circumferential surface of the second electrical wire 13B. This seals the second electrical wire 13B and the rubber plug 15.

The inner diameter of the third through-hole 22C is somewhat larger than the outer diameter of the third electrical wire 13C. Third electrical wire-side lips 26C that come into intimate contact with the outer circumferential surface of the third electrical wire 13C are formed as rings that extend along the circumferential direction of the third through-hole 22C on the inner circumferential surface of the third through-hole 22C. In the state where the third electrical wire 13C passes through the interior of the third through-hole 22C, the third electrical wire-side lips 26C are in intimate contact with the outer circumferential surface of the third electrical wire 13C. This seals the third electrical wire 13C and the rubber plug 15.

The inner diameter of the fourth through-hole 22D is somewhat larger than the outer diameter of the fourth electrical wire 13D. Fourth electrical wire-side lips 26D that come into intimate contact with the outer circumferential surface of the fourth electrical wire 13D are formed as rings that extend along the circumferential direction of the fourth through-hole 22D on the inner circumferential surface of the fourth through-hole 22D. In the state where the fourth electrical wire 13D passes through the interior of the fourth through-hole 22D, the fourth electrical wire-side lips 26D are in intimate contact with the outer circumferential surface of the fourth electrical wire 13D. This seals the fourth electrical wire 13D and the rubber plug 15.

The inner diameter of the fifth through-hole 22E is somewhat larger than the outer diameter of the fifth electrical wire 13E. Fifth electrical wire-side lips 26E that come into intimate contact with the outer circumferential surface of the fifth electrical wire 13E are formed as rings that extend along the circumferential direction of the fifth through-hole 22E on the inner circumferential surface of the fifth through-hole 22E. In the state where the fifth electrical wire 13E passes through the interior of the fifth through-hole 22E, the fifth electrical wire-side lips 26E are in intimate contact with the outer circumferential surface of the fifth electrical wire 13E. This seals the fifth electrical wire 13E and the rubber plug 15.

The inner diameter of the sixth through-hole 22F is somewhat larger than the outer diameter of the sixth electrical wire 13F. Sixth electrical wire-side lips 26F that come into intimate contact with the outer circumferential surface of the sixth electrical wire 13F are formed as rings that extend along the circumferential direction of the sixth through-hole 22F on the inner circumferential surface of the sixth through-hole 22F. In the state where the sixth electrical wire 13F passes through the interior of the sixth through-hole 22F, the sixth electrical wire-side lips 26F are in intimate contact with the outer circumferential surface of the sixth electrical wire 13F. This seals the sixth electrical wire 13F and the rubber plug 15.

As shown in FIG. 7, the first through-hole 22A and the second through-hole 22B form a wide through-hole pair 41 (one example of a through-hole group) for passage of the first electrical wire 13A and the second electrical wire 13B that have a relatively larger diameter. Also, the second through-hole 22C and the third through-hole 22D form a first narrow through-hole pair 42 (one example of a through-hole group) for passage of the third electrical wire 13C and the fourth electrical wire 13D having a smaller diameter than the first electrical wire 13A and the second electrical wire 13B. Also, the fifth through-hole 22E and the sixth through-hole 22F form a second narrow through-hole pair 43 (one example of a through-hole group) for passage of the fifth electrical wire 13E and the sixth electrical wire 13F having a smaller diameter than the first electrical wire 13A and the second electrical wire 13B.

In FIG. 7, in the rubber plug 15, an approximately central position of the multicore cable 11 at the end portion on the electrical wire through-hole portion 21 side is denoted by a point 56. The through-holes in the wide through-hole pair 41 are arranged point-symmetrically with respect to the point 56. Also, the first narrow through-hole pair 42 and the second narrow through-hole pair 43 are arranged point-symmetrically with respect to the point 56. The through-holes in the wide through-hole pair 41, the first narrow through-hole pair 42, and the second narrow through-hole pair 43 are arranged point-symmetrically with respect to the point 56 as a whole.

As shown in FIGS. 3 to 4, the cap 17 made of a synthetic resin is fitted around the rubber plug 15. The cap 17 is fitted around the rubber plug 15 from the side (left side in FIG. 3) on which the first electrical wire 13A, the second electrical wire 13B, the third electrical wire 13C, the fourth electrical wire 13D, the fifth electrical wire 13E, and the sixth electrical wire 13F extend out from the end portion 14A of the sheath 14. The cap 17 is open toward the sheath 14 (rightward in FIG. 3) from the side from which the first electrical wire 13A, the second electrical wire 13B, the third electrical wire 13C, the fourth electrical wire 13D, the fifth electrical wire 13E, and the sixth electrical wire 13F extend out. The open end edge of the cap 17 is in contact with the flange portion 19 of the rubber plug 15.

Figure 9:
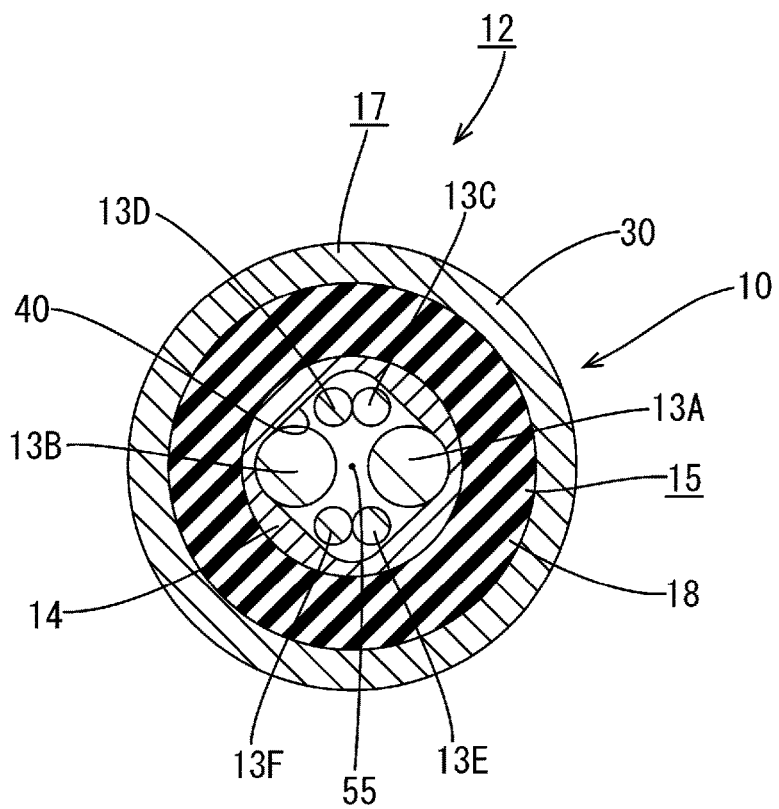
FIG. 9 is a cross-sectional view taken along line IX-IX in FIG. 8.

The cap 17 is provided with a wide portion 30 that is fitted around the sheath fitting portion 18 of the rubber plug 15 at a position on the open end edge side (right side in FIG. 4) of the cap 17. As shown in FIG. 9, the cross-sectional shape of the wide portion 30 is circular and conforms to the outer shape of the sheath fitting portion 18. The inner circumferential surface of the wide portion 30 comes into intimate contact with a plurality (three in the present embodiment) of wide portion-side lips 31 that are formed on the outer circumferential surface of the sheath fitting portion 18. As shown in FIGS. 3 and 4, the wide portion-side lips 31 are formed on the outer circumferential surface of the sheath fitting portion 18, protruding outward and extending along the circumferential direction of the sheath fitting portion 18. When the wide portion-side lips 31 and the inner circumferential surface of the wide portion 30 of the cap 17 are in intimate contact, the wide portion 30 of the cap 17 and the sheath fitting portion 18 of the rubber plug 15 are sealed.

As shown in FIGS. 3 to 4, in the state where the wide portion 30 of the cap 17 is fitted around the sheath fitting portion 18 of the rubber plug 15, the wide portion 30 presses the sheath fitting portion 18 inward in the radial direction of the sheath fitting portion 18. Accordingly, the sheath fitting portion 18 is pressed against the outer circumferential surface of the sheath 14 from the outside. Accordingly, the sheath-side lips 20 of the sheath fitting portion 18 reliably come into intimate contact with the outer circumferential surface of the sheath 14.

Figure 5:
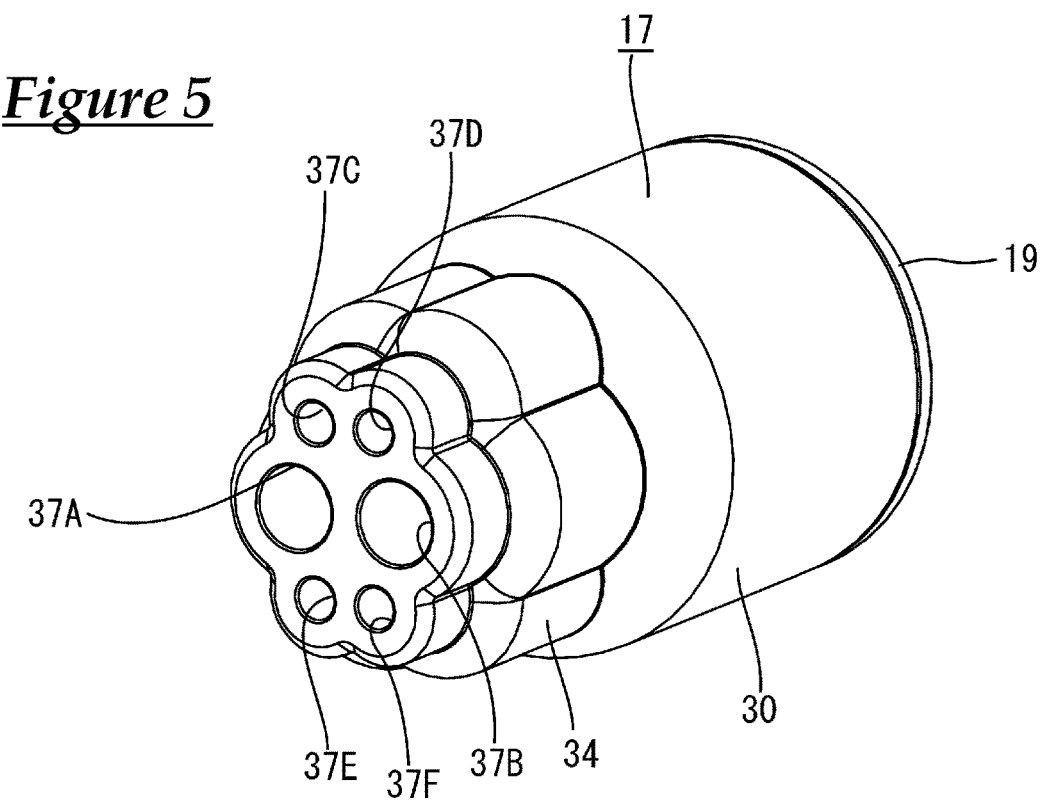
FIG. 5 is a perspective view showing a state in which a cap is fitted around a rubber plug.

As shown in FIG. 3, a narrow portion 34 that is fitted around the electrical wire through-hole portion 21 of the rubber plug 15 is provided at a position in the cap 17 that is opposite (left side in FIG. 3) to the direction in which the cap 17 is open relative to the wide portion 30. The outer diameter of the narrow portion 34 is set to be smaller than the outer diameter of the wide portion 30. As shown in FIG. 5, the shape of the narrow portion 34 conforms to the outer shape of the electrical wire through-hole portion 21.

As shown in FIGS. 3 and 4, the inner circumferential surface of the narrow portion 34 comes into intimate contact with a plurality (three in the present embodiment) of narrow portion-side lips 35 formed on the outer circumferential surface of the electrical wire through-hole portion 21. As shown in FIG. 6, the narrow portion-side lips 35 are formed on the outer circumferential surface of the electrical wire through-hole portion 21, protruding outward and extending along the circumferential direction of the electrical wire through-hole portion 21. When the narrow portion-side lips 35 come into intimate contact with the inner circumferential surface of the narrow portion 34 of the cap 17, the narrow portion 34 of the cap 17 and the electrical wire through-hole portion 21 of the rubber plug 15 are sealed.

As shown in FIGS. 3 to 4, in the state where the narrow portion 34 of the cap 17 is fitted around the electrical wire through-hole portion 21 of the rubber plug 15, the narrow portion 34 presses the electrical wire through-hole portion 21 inward in the radial direction of the electrical wire through-hole portion 21. Accordingly, the electrical wire through-hole portion 21 is compressed from the outside. Accordingly, the first to sixth electrical wire-side lips 26A, 26B, 26C, 26D, 26E, and 26F formed on the inner circumferential surfaces of the first to sixth through-holes 22A, 22B, 22C, 22D, 22E, and 22F are reliably brought into intimate contact with the radially outer sides of the first to sixth electrical wires 13A, 13B, 13C, 13D, 13E, and 13F respectively.

As shown in FIGS. 3 and 4, the cap 17 is provided with a bottom wall 36 at a position that is opposite to the direction in which the cap 17 is open. As shown in FIGS. 3 and 4, a first lead-out hole 37A, a second lead-out hole 37B, a third lead-out hole 37C, a fourth lead-out hole 37D, a fifth lead-out hole 37E, and a sixth lead-out hole 37F are formed in the bottom wall 36, passing through the bottom wall 36 such that the first electrical wire 13A, the second electrical wire 13B, the third electrical wire 13C, the fourth electrical wire 13D, the fifth electrical wire 13E, and the sixth electrical wire 13F respectively extend out from the cap 17.

Figure 8:
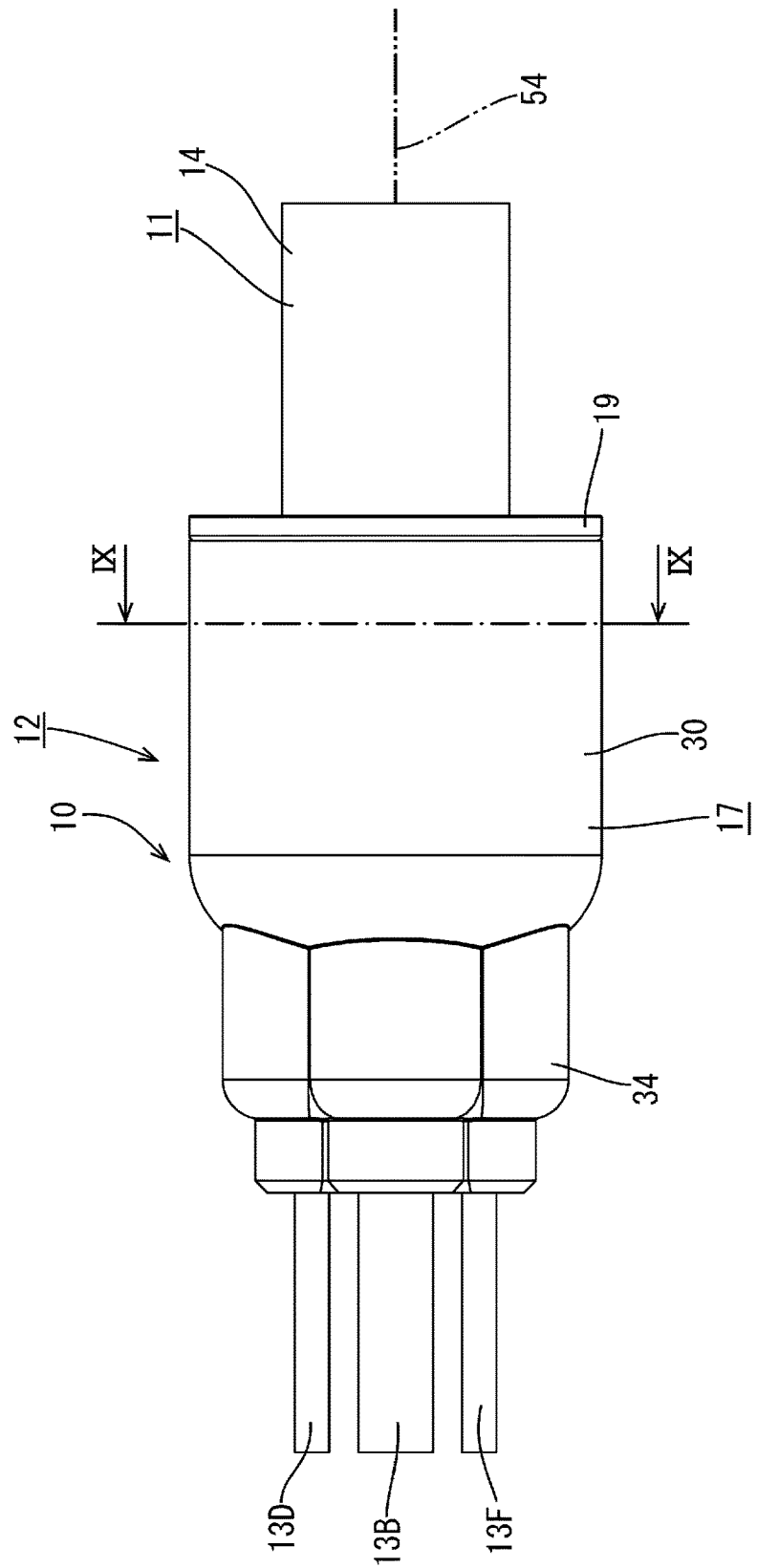
FIG. 8 is a side view showing the seal structure for a multicore cable.

FIG. 9 shows a cross-sectional view taken along line IX-IX in FIG. 8. In FIG. 9, an approximately central position of the multicore cable 11 on the cross section taken along line IX-IX is denoted by a point 55. The sheath 14 is pressed by the sheath fitting portion 18 of the rubber plug 15. An inner surface 40 of the sheath 14 deforms to a shape corresponding to the arrangement of the first to sixth electrical wires 13A, 13B, 13C, 13D, 13E, and 13F. The inner surface 40 of the sheath 14 has an approximately rhombic shape. Specifically, the first electrical wire 13A, the second electrical wire 13B, the first signal electrical wire pair 51 constituted by the third electrical wire 13C and the fourth electrical wire 13D, and the second signal electrical wire pair 52 constituted by the fifth electrical wire 13E and the sixth electrical wire 13F form vertex portions of the approximately rhombic shape.

In FIG. 9, power electrical wires in the power electrical wire pair 50 are arranged point-symmetrically with respect to the point 55. Also, the first signal electrical wire pair 51 and the second signal electrical wire pair 52 are arranged point-symmetrically with respect to the point 55. The electrical wires in the power electrical wire pair 50, the first signal electrical wire pair 51, and the second signal electrical wire pair 52 are arranged point-symmetrically with respect to the point 55 as a whole. Accordingly, when the sheath 14 deforms so as to be squashed inward in the radial direction by the sheath fitting portion 18 of the rubber plug 15, the inner surface 40 of the sheath 14 deforms to a position on the outer circumferential surfaces of the first to sixth electrical wires 13A, 13B, 13C, 13D, 13E, and 13F. At this time, the electrical wires in the power electrical wire pair 50, the first signal electrical wire pair 51, and the second signal electrical wire pair 52 are arranged point-symmetrically with respect to the point 55, and thus the inner surface 40 of the sheath 14 deforms into a shape that is substantially point symmetrical with respect to the point 55. As a result, a pressing force of the sheath fitting portion 18 of the rubber plug 15 is evenly applied to the sheath 14. Accordingly, the inner surface 40 of the sheath 14 has an approximately rhombic shape, and has a shape close to a circle. Thus, the pressing force applied from the outside of the sheath 14 is evenly applied to the inner surface 40 of the sheath 14.

Figure 10:
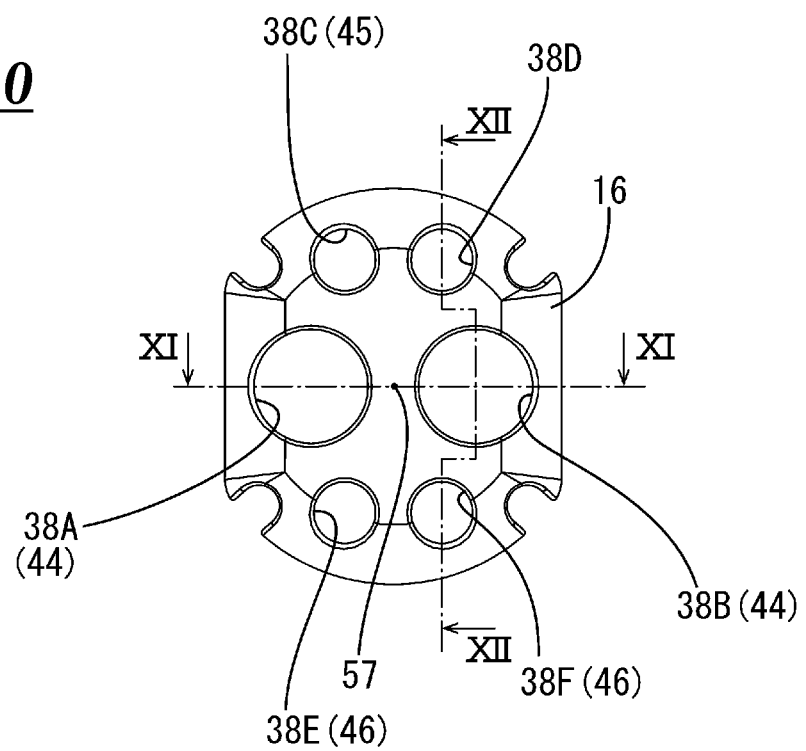
FIG. 10 is a front view showing a guide member.
Figure 11:
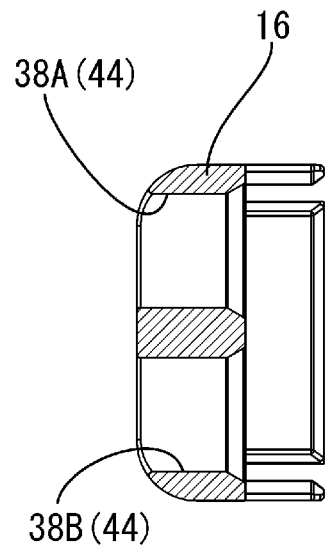
FIG. 11 is a cross-sectional view taken along line XI-XI in FIG. 10.
Figure 12:
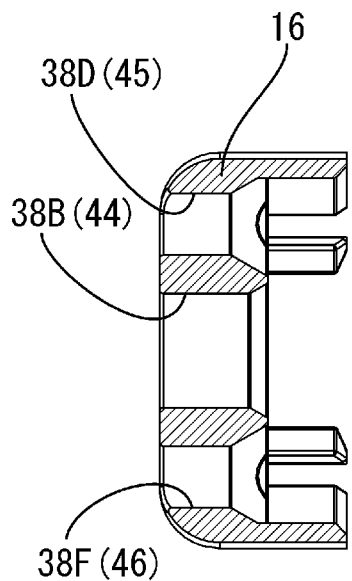
FIG. 12 is a cross-sectional view taken along line XII-XII in FIG. 10.

As shown in FIGS. 10 and 12, the guide member 16 is made of a synthetic resin, and is provided with a first guide hole 38A for passage of the first electrical wire 13A, a second guide hole 38B for passage of the second electrical wire 13B, a third guide hole 38C for passage of the third electrical wire 13C, a fourth guide hole 38D for passage of the fourth electrical wire 13D, a fifth guide hole 38E for passage of the fifth electrical wire 13E, and a sixth guide hole 38F for passage of the sixth electrical wire 13F.

The guide member 16 is held by the holding portion 28 of the rubber plug 15. Accordingly, the first to sixth through-holes 22A, 22B, 22C, 22D, 22E, and 22F of the rubber plug 15 are respectively aligned with the first to sixth guide holes 38A, 38B, 38C, 38D, 38E, and 38F of the guide member 16. More specifically, the first through-hole 22A and the first guide hole 38A are aligned with each other, the second through-hole 22B and the second guide hole 38B are aligned with each other, the third through-hole 22C and the third guide hole 38C are aligned with each other, the fourth through-hole 22D and the fourth guide hole 38D are aligned with each other, the fifth through-hole 22E and the fifth guide hole 38E are aligned with each other, and the sixth through-hole 22F and the sixth guide hole 38F are aligned with each other.

As shown in FIG. 10, the first guide hole 38A and the second guide hole 38B form a wide guide hole pair 44 (one example of guide hole groups) for passage of the first electrical wire 13A and the second electrical wire 13B having a relatively larger diameter. Also, the second guide hole 38C and the third guide hole 38D form a first narrow guide hole pair 45 (one example of guide hole groups) for passage of the third electrical wire 13C and the fourth electrical wire 13D having a smaller diameter than the first electrical wire 13A and the second electrical wire 13B. Also, the fifth guide hole 38E and the sixth guide hole 38F form a second narrow guide hole pair 46 (one example of guide hole groups) for passage of the fifth electrical wire 13E and the sixth electrical wire 13F having a smaller diameter than the first electrical wire 13A and the second electrical wire 13B.

In FIG. 10, an approximately central position of the multicore cable 11 at the end portion of the guide member 16 is denoted by a point 57. The wide holes in the wide hole pair 44 are arranged point-symmetrically with respect to the point 57. Also, the first narrow guide hole pair 45 and the second narrow guide hole pair 46 are arranged point-symmetrically with respect to the point 57. The through-holes in the wide through-hole pair 41, the first narrow through-hole pair 42, and the second narrow guide hole pair 46 are arranged point-symmetrically with respect to the point 57 as a whole.

Effects of Embodiments

Figure 13:
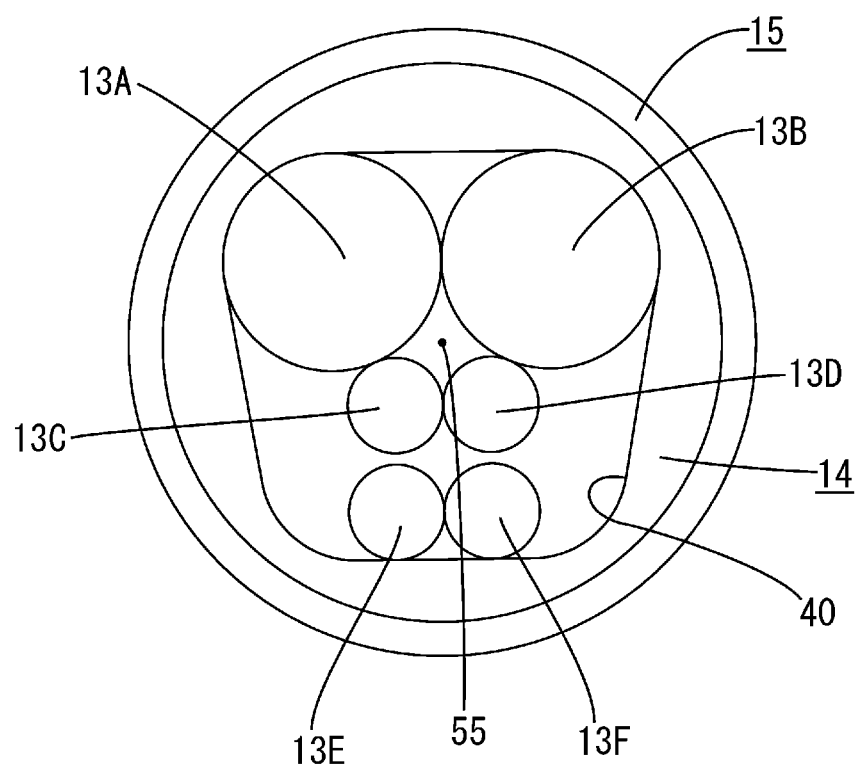
FIG. 13 is a schematic diagram showing a seal structure for a multicore cable according to a hypothetical technique.

Next, the effects of the present embodiment will be described. First, a hypothetical technique will be described for comparison with the effects of the present embodiments.
Hypothetical Technique A state in which the sheath 14 is pressed by the rubber plug 15 is schematically shown in FIG. 13. In a hypothetical technique, on the upper side in FIG. 13, the first electrical wire 13A and the second electrical wire 13B are arranged side-by-side in the horizontal direction in the inner portion of the sheath 14, the third electrical wire 13C and the fourth electrical wire 13D are arranged side-by-side in the horizontal direction below the first electrical wire 13A and the second electrical wire 13B, and the fifth electrical wire 13E and the sixth electrical wire 13F are arranged side-by-side in the horizontal direction below the third electrical wire 13C and the fourth electrical wire 13D.

In the hypothetical technique, the first to sixth electrical wires 13A, 13B, 13C, 13D, 13E, and 13F are not arranged point-symmetrically with respect to the axis 54 of the sheath 14 (indicating the longitudinal direction of the sheath 14) and the point 55 indicating the central position of the multicore cable 11. Thus, the inner surface 40 of the sheath 14 that is pressed by the rubber plug 15 does not deform to a shape that is in point symmetry with respect to the point 55. In particular, a gap is formed between the inner surface 40 of the sheath 14 and the third electrical wire 13C, the fourth electrical wire 13D, the fifth electrical wire 13E, and the sixth electrical wire 13F in the horizontal direction in FIG. 13. A region in which this gap is formed and portions of the inner surface 40 of the sheath 14 that are in contact with the first electrical wire 13A and the second electrical wire 13B have different pressing forces in the radially inward direction.

Figure 14:
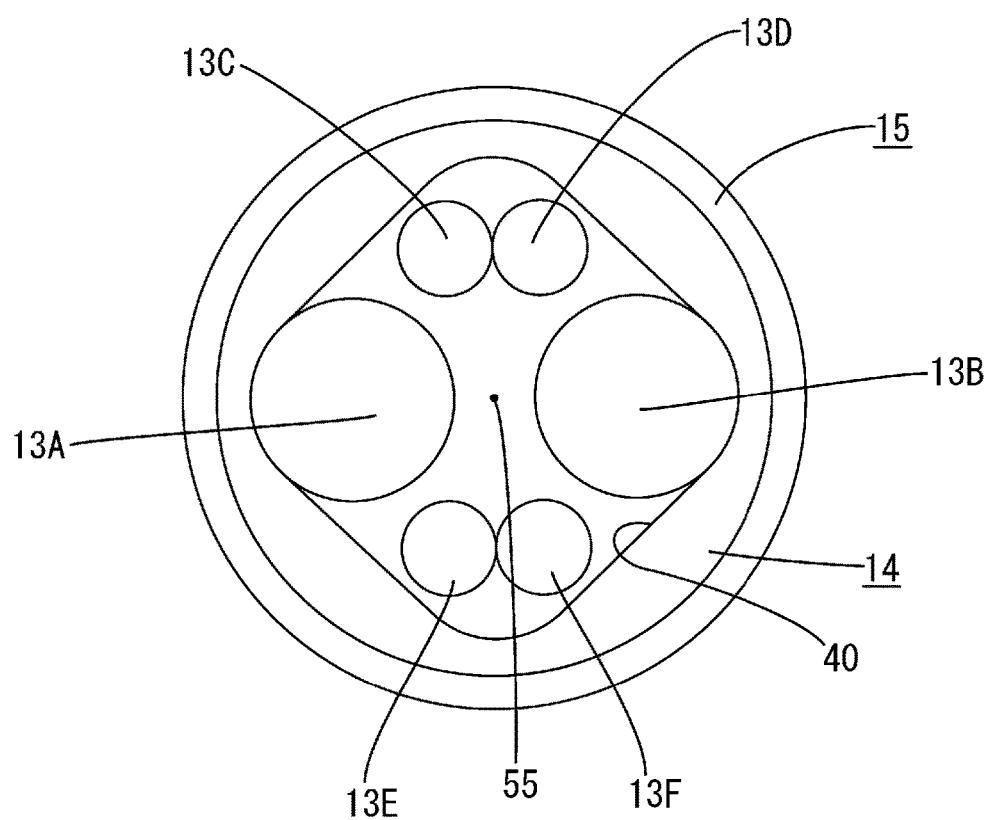
FIG. 14 is a schematic diagram showing a seal structure for a multicore cable according to Embodiment 1.

On the other hand, with regard to the present embodiment, a state in which the sheath 14 is pressed by the rubber plug 15 is schematically shown in FIG. 14. As described above, when the sheath 14 is pressed by the rubber plug 15, the inner surface 40 of the sheath 14 deforms to a shape that is substantially in point symmetry with respect to the axis 54 (indicating the longitudinal direction of the sheath 14) of the sheath 14 and the point 55 that indicates the central position of the multicore cable 11. Specifically, the inner surface 40 of the sheath 14 has an approximately rhombic shape. Accordingly, pressure applied from the rubber plug 15 to the sheath 14 is evenly applied from the inner surface 40 of the sheath 14 to the outer surfaces of the first to sixth electrical wires 13A, 13B, 13C, 13D, 13E, and 13F.

Compared with the cross-sectional shape of the inner surface 40 of the sheath 14 in the hypothetical technique expressed in FIG. 13, the inner surface 40 of the sheath 14 according to the present embodiment has an approximately rhombic shape and has a shape that is relatively close to a circle. Accordingly, a force that is applied from the outside of the sheath 14 to the rubber plug 15 is evenly applied to the inner surface 40 of the sheath 14.

Figure 15:
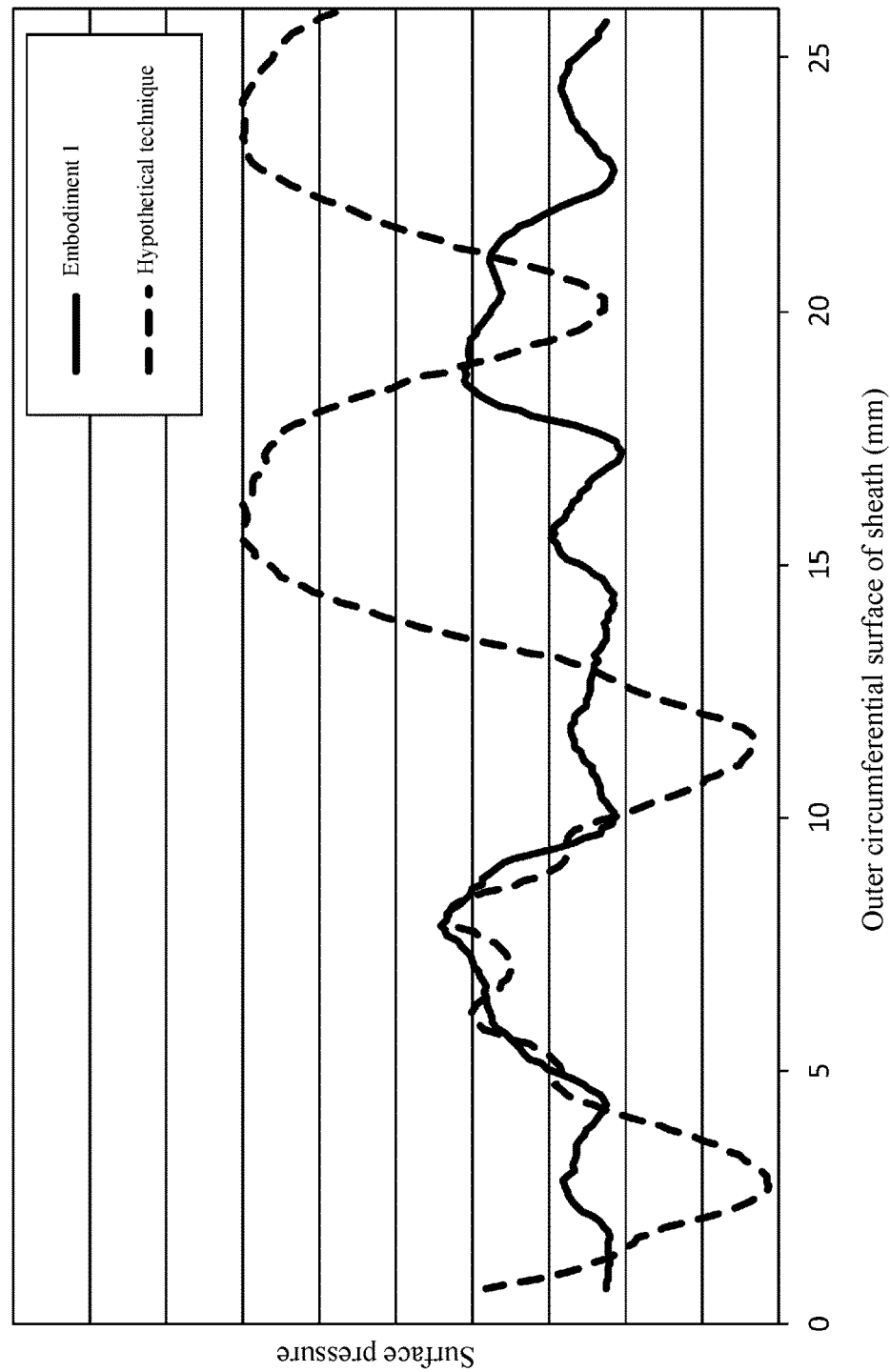
FIG. 15 is a graph showing a relationship between a position of an outer circumferential surface of a sheath and an inner surface pressure of the sheath.

FIG. 15 shows a relationship between positions on the outer circumferential surface of the sheath 14 and the surface pressure of the inner surface 40 of the sheath 14 with regard to the hypothetical technique and the present embodiment. In the hypothetical technique, the surface pressure varies depending on the position on the outer circumferential surface of the sheath 14. Specifically, the surface pressure rapidly decreases in portions of the third electrical wire 13C and the fifth electrical wire 13E that correspond to the gaps formed in the horizontal direction in FIG. 13, the surface pressure rapidly increases in portions at which the fifth electrical wire 13E and the sixth electrical wire 13F are in contact with the inner surface 40 of the sheath 14, and the surface pressure rapidly decreases again in portions of the fifth electrical wire 13E and the sixth electrical wire 13F that correspond to the gaps formed in the horizontal direction in FIG. 13. Thereafter, the surface pressure rapidly increases in the portions at which the first electrical wire 13A and the inner surface 40 of the sheath 14 are in contact with each other, and the surface pressure also rapidly increases in portions at which the second electrical wire 13B and the inner surface 40 of the sheath 14 are in contact with each other. In this manner, in the hypothetical technique, the inner surface 40 of the sheath 14 has an extremely non-uniform surface pressure.

In contrast, in the present embodiment, the surface pressure of the inner surface 40 of the sheath 14 has an approximately constant value even at different positions on the outer circumferential surface of the sheath 14.

A seal structure for a multicore cable according to the present embodiment includes a multicore cable in which a plurality of electrical wires are enveloped by a sheath, the plurality of electrical wire extending out from an end portion of the sheath, and a rubber plug having a sheath fitting portion that is fitted around the end portion of the sheath, in which a plurality of electrical wire pairs are arranged point-symmetrically with respect to the point 55 in at least a region inside the rubber plug, in the cross section that is orthogonal to the axis 54 of the multicore cable, each electrical wire pair being constituted by two of the plurality of electrical wires.

According to the above-described configuration, the first to sixth electrical wires 13A, 13B, 13C, 13D, 13E, and 13F are arranged point-symmetrically with respect to the point 55. Accordingly, the sheath 14 pressed by the sheath fitting portion 18 of the rubber plug 15 deforms inward in the radial direction of the sheath 14, and as a result of the sheath 14 having a shape that conforms to the outer surfaces of the first to sixth electrical wires 13A, 13B, 13C, 13D, 13E, and 13F, the inner pressure of the sheath 14 is approximately evenly applied to the first to sixth electrical wires 13A, 13B, 13C, 13D, 13E, and 13F. Accordingly, it is possible to improve the seal between the sheath 14 and the rubber plug 15.

Also, in the present embodiment, the first signal electrical wire pair 51 and the second signal electrical wire pair 52 each include twisted pair 53 electrical wires obtained by twisting two electrical wires. Accordingly, it is possible to reduce the influence of noise with regard to the third to sixth electrical wires 13C, 13D, 13E, and 13F, which are for carrying a signal.

Also, in the present embodiment, the plurality of electrical wires are six electrical wires, namely, the first to sixth electrical wires 13A, 13B, 13C, 13D, 13E, and 13F. Accordingly, the electrical wires can be arranged more point symmetrically with respect to the point 55 in the sheath 14. As a result, it is possible to improve the seal between the sheath 14 and the rubber plug 15.

Embodiment 2

Next, Embodiment 2 of the technology disclosed in the present specification will be described with reference to FIGS. 16 to 20. Embodiment 2 differs from Embodiment 1 in that the structure for individually sealing a plurality of electrical wires is omitted.

Figure 16:
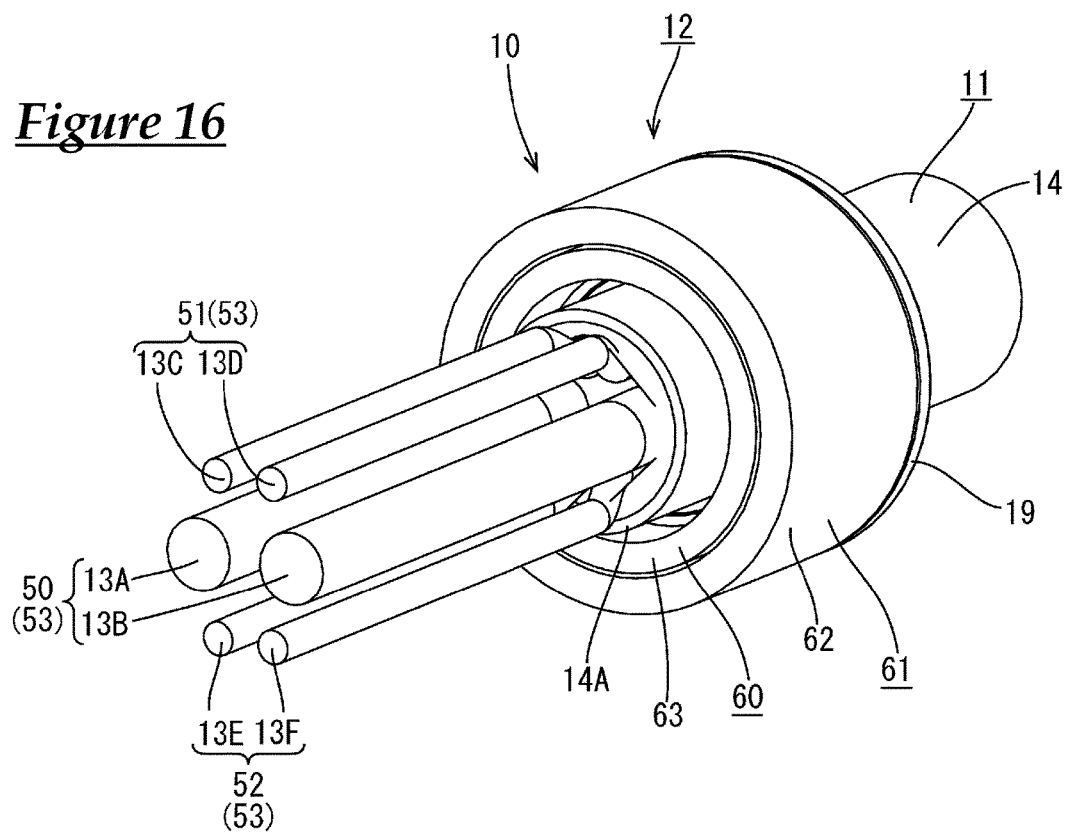
FIG. 16 is a perspective view showing a seal structure for a multicore cable according to Embodiment 2.
Figure 18:
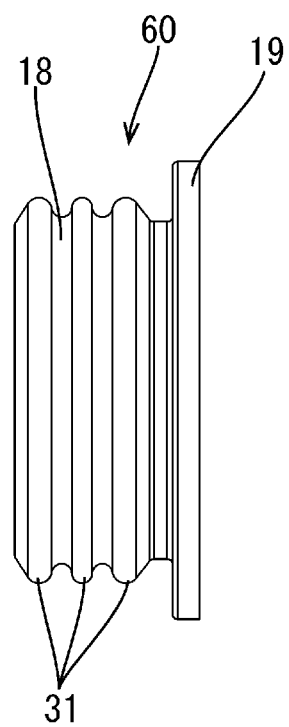
FIG. 18 is a side view showing the rubber plug.

As shown in FIG. 16, a rubber plug 60 is fitted around an end portion 14A of a sheath 14. As shown in FIG. 18, the rubber plug 60 has a sheath fitting portion 63 that is fitted around the end portion 14A of the sheath 14. The sheath fitting portion 63 extends to the side opposite to the end portion 14A of the sheath 14 and is shaped as a hood that is open in a direction that is opposite to the end portion 14A of the sheath 14. A flange portion 19 that protrudes outward in the radial direction of the sheath fitting portion 63 is formed at an end edge portion of the sheath fitting portion 63. The sheath fitting portion 63 is shaped as a substantially circular tube in its natural state.

Figure 17:
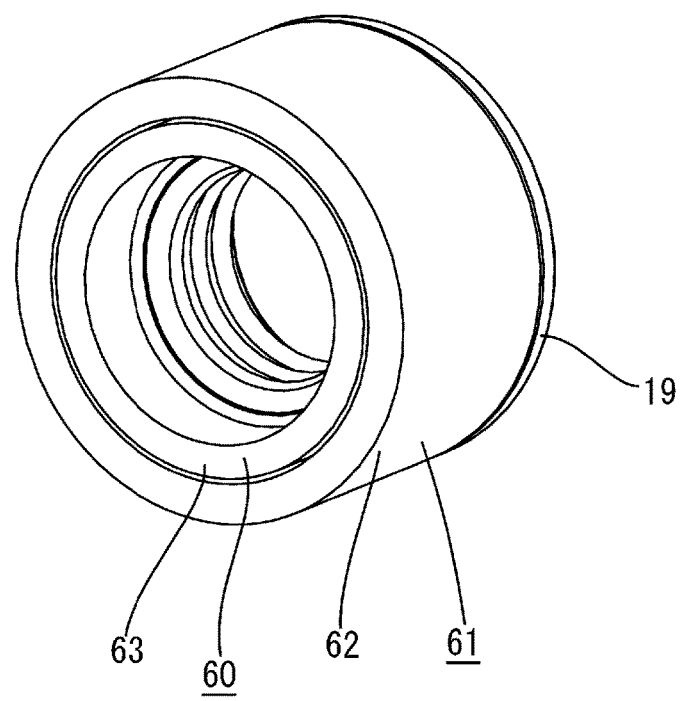
FIG. 17 is a perspective view showing a state in which a cap is fitted around a rubber plug.

As shown in FIG. 17, a cap 61 according to the present embodiment is provided with a wide portion 62 that is fitted around the sheath fitting portion 63 of the rubber plug 60. As shown in FIG. 17, the cross-sectional shape of the wide portion 62 conforms to the outer shape of the sheath fitting portion 63 and is circular.

Figure 19:
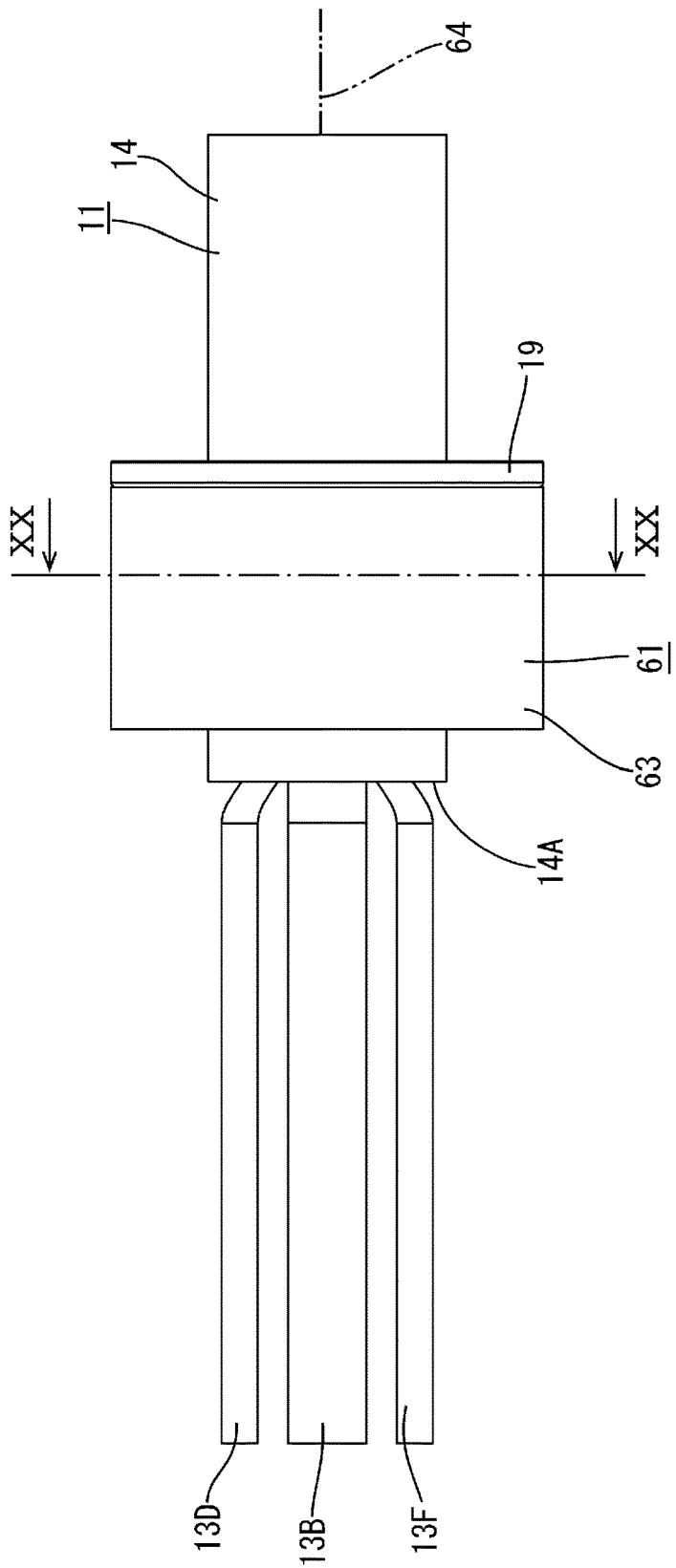
FIG. 19 is a side view showing the seal structure for a multicore cable.
Figure 20:
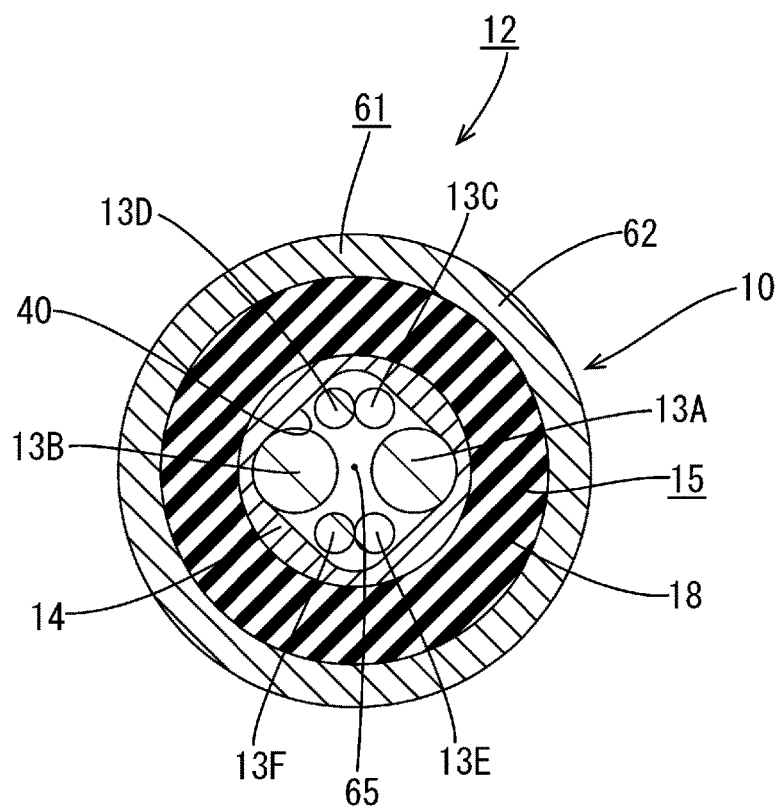
FIG. 20 is a cross-sectional view taken along line XX-XX in FIG. 19.

FIG. 20 shows a cross-sectional view taken along line XX-XX in FIG. 19. In FIG. 20, a point 65 indicating a central position of the multicore cable 11 on the cross section taken along line XX-XX in FIG. 19 is expressed at an approximately central position of the sheath 14. When the sheath 14 is pressed by the sheath fitting portion 63 of the rubber plug 60, the sheath 14 deforms so as to be squashed inward in the radial direction of the sheath 14. An inner surface 40 of the sheath 14 deforms to a shape corresponding to the arrangement of first to sixth electrical wires 13A, 13B, 13C, 13D, 13E, and 13F.

In FIG. 20, power electrical wires in a power electrical wire pair 50 are arranged point-symmetrically with respect to the point 65. Also, the first signal electrical wire pair 51 and the second signal electrical wire pair 52 are arranged point-symmetrically with respect to the point 65. The electrical wires in the power electrical wire pair 50, the first signal electrical wire pair 51, and the second signal electrical wire pair 52 are arranged point-symmetrically with respect to the point 65 as a whole. Accordingly, when the sheath 14 deforms so as to be squashed inward in the radial direction by the sheath fitting portion 63 of the rubber plug 60, the inner surface 40 of the sheath 14 deforms to a position on the outer circumferential surfaces of the first to sixth electrical wires 13A, 13B, 13C, 13D, 13E, and 13F. At this time, the electrical wires in the power electrical wire pair 50, the first signal electrical wire pair 51, and the second signal electrical wire pair 52 are arranged point-symmetrically with respect to the point 65, and thus the inner surface 40 of the sheath 14 deforms into a shape that is substantially point symmetrical with respect to the point 65. As a result, a pressing force of the sheath fitting portion 63 of the rubber plug 60 is evenly applied to the sheath 14.

Configurations other than those described above are approximately similar to those of Embodiment 1, and therefore identical members are denoted by identical reference numerals and redundant description thereof is not included.

In the present embodiment, structures of the cap 61 and the rubber plug 60 are simplified. It is possible to improve the seal between the sheath 14 and the rubber plug 60 due to such a simple configuration.

Other Embodiments

The technology disclosed in the present specification is not limited to the embodiments described above using the foregoing description and drawings, and embodiments such as the following are also encompassed in the technical scope of the present invention.

Figure 21:
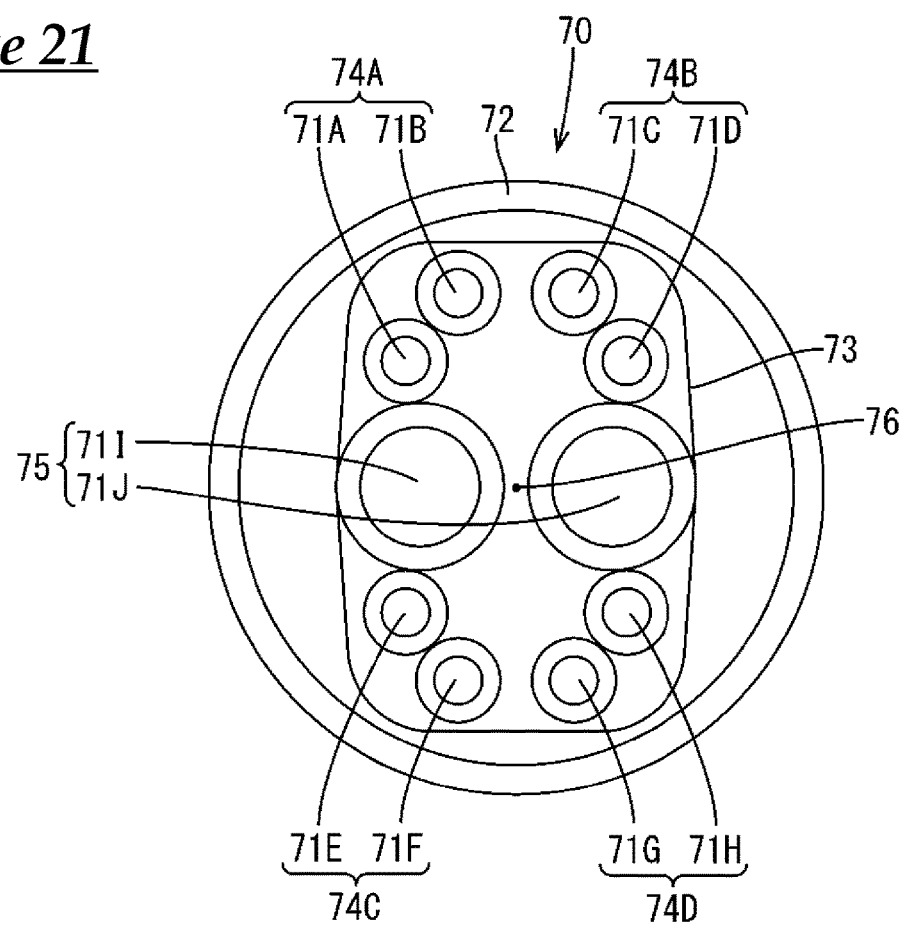
FIG. 21 is a diagram of an end surface of a multicore cable according to Other Embodiment (1).

Although the number of electrical wires was six in Embodiment 1, the present invention is not limited to this, and the number of electrical wires may also be two or more. For example, the multicore cable shown in FIG. 21 includes ten electrical wires 71A, 71B, 71C, 71D, 71E, 71F, 71G 71H, 71I, and 71J arranged inside a sheath 72. The ten electrical wires 71A to 71J are collectively covered by a sheet 73 inside the sheath 72. The sheet 73 may be made of any materials such as paper and a synthetic resin as necessary. The electrical wires 71A to 71J are twisted two by two, forming so-called twisted pairs. FIG. 21 shows a first signal wire pair 74A (one examples of electrical wire groups) constituted by two electrical wires 71A and 71B, a second signal wire pair 74B (one examples of electrical wire groups) constituted by two electrical wires 71C and 71D, a third signal wire pair 74C (one examples of electrical wire groups) constituted by two electrical wires 71E and 71F, a fourth signal wire pair 74D (one examples of electrical wire groups) for signals constituted by two electrical wires 71G and 71H, and a power electrical wire pair 75 (one examples of electrical wire groups) for power constituted by two electrical wires 71I and 71J. As shown in FIG. 21, the electrical wires in the first signal wire pair 74A to the fourth signal wire pair 74D and the power electrical wire pair 75 are arranged point-symmetrically with respect to the point 76 in the multicore cable 70.

Figure 22:
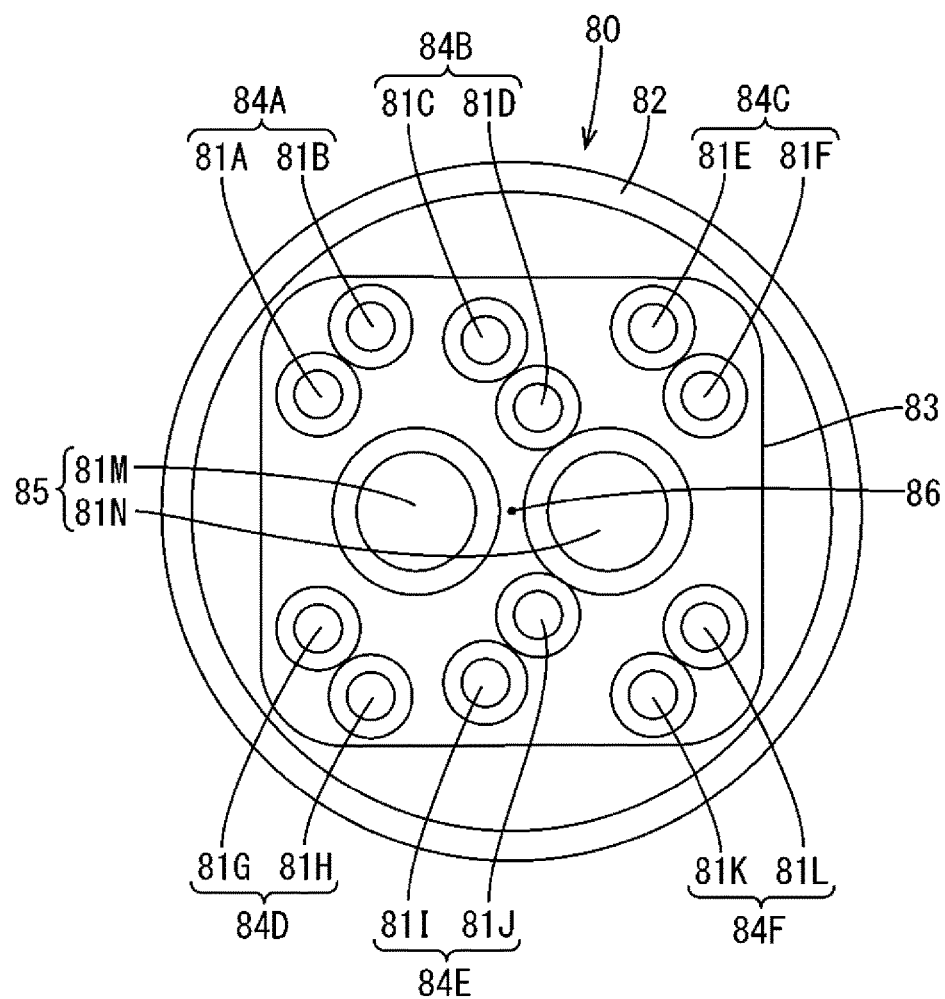
FIG. 22 is a diagram of an end surface of a multicore cable according to Other Embodiment (2).

Also, as shown in FIG. 22, a multicore cable 80 may have a configuration in which fourteen electrical wires 81A, 81B, 81C, 81D, 81E, 81F, 81G 81H, 81I, 81J, 81K, 81L, 81M, and 81N are arranged inside a sheath 82. The fourteen electrical wires 81A to 81N are collectively covered by a sheet 83 inside the sheath 82. The electrical wires 81A to 81N are obtained by twisting two electrical wires, forming so-called twisted pairs. FIG. 22 shows a first signal wire pair 84A (one example of electrical wire groups), a second signal wire pair 84B (one example of electrical wire groups), a third signal wire pair 84C (one example of electrical wire groups), and a fourth signal wire pair 84D (one example of electrical wire groups), a fifth signal wire pair 84E (one example of electrical wire groups), and a sixth signal wire pair 84F (one example of electrical wire groups) for signals, and a power electrical wire pair 85 (one example of electrical wire groups) for power. As shown in FIG. 22, the electrical wires in the power electrical wire pair 85 are arranged point-symmetrically with respect to the point 86 in the multicore cable 80. Note that the first signal wire pair 84A to the sixth signal wire pair 84F are each obtained by twisting two electrical wires, and thus the signal wire pairs 84A to 84F occupy regions in which two electrical wires are helically twisted in the sheath 82. In these regions occupied by the signal wire pairs 84 to 84F, the electrical wires in the first signal wire pair 84A to the sixth signal wire pair 84F are arranged point-symmetrically with respect to the point 86.

Although one multicore cable is configured to include six electrical wires in Embodiment 1, one multicore cable is configured to include ten electrical wires, and one multicore cable is configured to include fourteen electrical wires, the present invention is not limited to these, and one multicore cable may be configured to include any number of electrical wires.

Although the first signal electrical wire pair 51 and the second signal electrical wire pair 52 are each a twisted pair 53 in Embodiment 1, the present invention is not limited to this, and a configuration is also possible in which two electrical wires simply form a pair and are not twisted.

Although in Embodiment 1, a configuration was adopted in which the electrical wire groups are each an electrical wire pair constituted by two electrical wires, the present invention is not limited to this, and a configuration is also possible in which the electrical wire groups each include three or more electrical wires.

It is to be understood that the foregoing is a description of one or more preferred exemplary embodiments of the invention. The invention is not limited to the particular embodiment(s) disclosed herein, but rather is defined solely by the claims below. Furthermore, the statements contained in the foregoing description relate to particular embodiments and are not to be construed as limitations on the scope of the invention or on the definition of terms used in the claims, except where a term or phrase is expressly defined above. Various other embodiments and various changes and modifications to the disclosed embodiment(s) will become apparent to those skilled in the art. All such other embodiments, changes, and modifications are intended to come within the scope of the appended claims.

As used in this specification and claims, the terms "for example," "e.g.," "for instance," "such as," and "like," and the verbs "comprising," "having," "including," and their other verb forms, when used in conjunction with a listing of one or more components or other items, are each to be construed as open-ended, meaning that the listing is not to be considered as excluding other, additional components or items. Other terms are to be construed using their broadest reasonable meaning unless they are used in a context that requires a different interpretation.

LIST OF REFERENCE NUMERALS

10 Seal member
11 Multicore cable
12 Seal structure
13A First electrical wire
13B Second electrical wire
13C Third electrical wire
13D Fourth electrical wire
13E Fifth electrical wire
13F Sixth electrical wire
22A First through-hole
22B Second through-hole
22C Third through-hole
22D Fourth through-hole
22E Fifth through-hole
22F Sixth through-hole
14 Sheath
15 Rubber plug
16 Guide member
20 Sheath-side lip
26A First electrical wire-side lip
26B Second electrical wire-side lip
26C Third electrical wire-side lip
26D Fourth electrical wire-side lip
26E Fifth electrical wire-side lip
26F Sixth electrical wire-side lip
28 Holding portion
41 Wide through-hole pair
42 First narrow through-hole pair
43 Second narrow through-hole pair
50 Power electrical wire pair
51 First signal electrical wire pair
52 Second signal electrical wire pair
53 Twisted pair

The invention claimed is:

1. A seal structure for a multicore cable, comprising:
a multicore cable in which a plurality of electrical wires are enveloped by a sheath, the plurality of electrical wires extending out from an end portion of the sheath; and
a rubber plug having a sheath fitting portion that is fitted around the end portion of the sheath,
wherein a plurality of electrical wire groups are arranged point-symmetrically in a region in which the sheath fitting portion is fitted around the end portion of the sheath, in a cross section of the sheath that is orthogonal to a longitudinal direction of the multicore cable, the plurality of electrical wire groups each being constituted by at least two of the plurality of electrical wires,
the rubber plug has an electrical wire through-hole portion having a plurality of through-holes through which the plurality of electrical wires respectively pass, the plurality of electrical wires extending out from the end portion of the sheath,
inner circumferential surfaces of the plurality of through-holes are each provided with electrical wire-side lips that are in intimate contact with outer circumferential surfaces of the plurality of electrical wires,
the plurality of through-holes form a plurality of through-hole groups corresponding to the plurality of electrical wire groups, and the through-hole groups are point symmetrically formed in the cross section of the sheath that is orthogonal to the longitudinal direction of the multicore cable,
the rubber plug is provided with, at a position located between the sheath fitting portion and the electrical wire through-hole portion, a holding portion configured to hold a guide member having a plurality of guide holes for passage of the plurality of respective electrical wires extending out from the end portion of the sheath, and
the plurality of guide holes and the plurality of through-holes correspond to each other in a state in which the guide member is held by the holding portion.

2. The seal structure for a multicore cable according to claim 1,
wherein the electrical wire groups include a twisted pair obtained by twisting the two electrical wires.

3. The seal structure for a multicore cable according to claim 1,
wherein the plurality of electrical wires include six electrical wires, and the plurality of electrical wire groups are constituted by three electrical wire groups that each include two electrical wires.

4. The seal structure for a multicore cable according to claim 1,
wherein the plurality of electrical wire groups include narrow electrical wire groups including narrow electrical wires that each have a relatively small diameter, and wide electrical wire groups including wide electrical wires that each have a larger diameter than the narrow electrical wires.

5. The seal structure for a multicore cable according to claim 4,
wherein two of the narrow electrical wire groups are arranged point-symmetrically, with the wide electrical wire groups interposed therebetween, in the cross section of the sheath that is orthogonal to the longitudinal direction of the multicore cable.

6. A rubber plug for attachment to a multicore cable in which a plurality of electrical wire groups are enveloped by a sheath, the plurality of electrical wire groups each being constituted by at least two electrical wires, the plurality of electrical wires extending out from an end portion of the sheath, the rubber plug comprising:

a sheath fitting portion that is fitted around the end portion of the sheath; and an electrical wire through-hole portion having a plurality of through-holes through which the plurality of electrical wires respectively pass, the plurality of electrical wires extending out from the end portion of the sheath, wherein an inner circumferential surface of the sheath fitting portion is provided with a sheath-side lip that is in intimate contact with an outer circumferential surface of the sheath, inner circumferential surfaces of the plurality of through-holes are each provided with electrical wire-side lips that are in intimate contact with outer circumferential surfaces of the plurality of electrical wires, the plurality of through-holes form a plurality of through-hole groups corresponding to the plurality of electrical wire groups, and the through-hole groups are point symmetrically formed in a cross section of the sheath that is orthogonal to a longitudinal direction of the multicore cable, the rubber plug is provided with, at a position located between the sheath fitting portion and the electrical wire through-hole portion, a holding portion configured to hold a guide member having a plurality of guide holes for passage of the plurality of respective electrical wires extending out from the end portion of the sheath, and the plurality of guide holes and the plurality of through-holes correspond to each other in a state in which the guide member is held by the holding portion.

* * * * *